United States Patent [19]
Heil et al.

[11] Patent Number: 5,269,005
[45] Date of Patent: Dec. 7, 1993

[54] METHOD AND APPARATUS FOR TRANSFERRING DATA WITHIN A COMPUTER SYSTEM

[75] Inventors: Thomas F. Heil, Easley; Edward A. McDonald; Gene F. Young, both of Lexington, all of S.C.

[73] Assignee: NCR Corporation, Dayton, Ohio

[21] Appl. No.: 761,185

[22] Filed: Sep. 17, 1991

[51] Int. Cl.⁵ .................................................. G06F 13/24
[52] U.S. Cl. ..................................... 395/275; 395/725
[58] Field of Search ............... 395/325, 275, 725, 250

[56] References Cited

U.S. PATENT DOCUMENTS

| | | | |
|---|---|---|---|
| 4,091,445 | 5/1978 | Ryan | 395/575 |
| 4,797,815 | 1/1989 | Moore | 395/325 |
| 4,805,106 | 2/1989 | Pfeifer | 395/650 |
| 4,807,109 | 2/1989 | Farrell et al. | 395/325 |
| 4,821,185 | 4/1989 | Esposito | 395/275 |
| 4,858,116 | 8/1989 | Gillett, Jr. et al. | 395/325 |
| 4,864,496 | 9/1989 | Triolo et al. | 395/325 |
| 4,868,742 | 9/1989 | Gant et al. | 395/325 |
| 4,912,630 | 3/1990 | Cochcroft et al. | 395/425 |
| 4,920,486 | 4/1990 | Nielsen | 395/325 |
| 4,949,239 | 8/1990 | Gillett, Jr. et al. | 395/325 |
| 4,953,072 | 8/1990 | Williams | 395/725 |
| 4,961,140 | 10/1990 | Pechanek et al. | 395/325 |
| 5,001,625 | 3/1991 | Thomas et al. | 395/325 |
| 5,006,981 | 4/1991 | Beltz et al. | 395/325 |
| 5,006,982 | 4/1991 | Ebersole et al. | 395/325 |
| 5,146,597 | 9/1992 | Williams | 395/725 |
| 5,151,979 | 9/1992 | Poskitt | 395/550 |

FOREIGN PATENT DOCUMENTS 1-144151  6/1989  Japan .

Primary Examiner—Robert L. Richardson
Assistant Examiner—D. Dinh

Attorney, Agent, or Firm—Jack R. Penrod; Paul J. Maginot

[57] ABSTRACT

In a processing system any response to an interrupt acknowledge cycle is deferred until the transfer of buffered data to be written from an agent on a subsystem I/O bus to main memory of the system is assured. To expedite system operation, data to be written to main memory by an agent on an I/O bus is buffered in an interface circuit. As soon as the data is buffered, the I/O bus agent is released and interrupts a processor on the system bus indicating completion of the data write. A tightly coupled interrupt controller is used so that the agent does not need to own the I/O or system bus to generate the interrupt. The interrupted processor issues an interrupt acknowledge (IAK) cycle on the system bus to receive an interrupt vector from the interrupt controller. The interface circuit recognizes the IAK cycle and generates a retry signal for the processor if buffered data remains in the interface circuit. In response to the retry signal, the processor is taken off the system bus and not allowed to regain the system bus until the buffered data is written to main memory. A bus busy signal is raised and will not be lowered until the data is written to main memory. When the busy signal is lowered, the processor regains the system bus and receives an interrupt vector from the interrupt controller. I/O bus ownership is locked until the interrupted processor has received an interrupt vector and the IAK cycle is complete. If no buffered data remains in the interface circuit, no retry signal is generated. The interrupt controller waits a predefined period of time for a retry signal and if none is detected, the interrupt controller issues an appropriate interrupt vector to complete the IAK cycle. For multiple I/O buses, preferably only one interface circuit retries processors issuing IAK cycles.

16 Claims, 8 Drawing Sheets

METHOD AND APPARATUS FOR TRANSFERRING DATA WITHIN A COMPUTER SYSTEM

BACKGROUND OF THE INVENTION

The present invention relates generally to computer systems and, more particularly, to methods and apparatus for operating computer systems in a manner to ensure that only up-to-date data are used in the computer systems.

Traditionally, computer systems have included a central processing unit or CPU, data storage devices including a main memory which is used by the CPU for performance of its operations and a system bus which interconnects the CPU to the main memory and any other data storage devices. I/O devices also are connected to a system via the bus. The bus thus serves as a communications link among the various devices making up a computer system by carrying clock and other command signals and data signals among the devices. A cache memory can be inserted between the main memory and the CPU to speed up memory operations which are traditionally slow in comparison to the operating speed of the CPU.

To further expand the operating speed and capacity of computer systems, systems including multiple processors and/or multiple system buses have been developed. Additional expansion is possible by the use of subsystem I/O buses which typically are coupled to the system bus or buses to connect additional devices or agents to the computer system. These additional resources can be used by the computer system and thereby expand the processing capabilities of the system. The addition of a subsystem I/O bus is advantageous since it presents only one load for the system bus or buses yet provides system access to a number of agents. If the agents are directly coupled to the system bus, they load the system bus with a load per device, such as eight or sixteen bus loads, as opposed to the single bus load presented by the subsystem I/O bus.

Additional improvements of the operating speed and capacity of computer systems can be made by buffering data exchanges between agents on a subsystem I/O bus and main memory on the system bus. By buffering these data exchanges, agents on the subsystem bus can operate at their full speed without being delayed by having to wait for data exchanges which are carried out at speeds slower than their normal operating speeds. Unfortunately, the inclusion of buffered subsystem I/O buses, cache memories and other operation enhancing devices in high performance computer systems can present system operating problems.

For example, in a computer system including a cache memory, a subsystem I/O bus with buffered data exchanges with main memory and an interrupt system which does not require ownership of either the system or I/O buses, i.e. a "tightly-coupled" interrupt system, an agent on the I/O bus can perform a buffered memory write and issue an interrupt to the processor indicating the write to main memory is complete The processor may then issue an interrupt acknowledge cycle and retrieve an interrupt vector from the interrupt system before the buffered data has actually been transferred to main memory. Thus, because the buffered data was not written to main memory, the processor will be operating with main memory data which is not up-to-date.

It is thus apparent that there is a need for improved methods and apparatus for operating a computer or processing system to ensure that only up-to-date data is used in the processing system.

SUMMARY OF THE INVENTION

This need is met by the methods and apparatus of the present invention wherein any response to an interrupt acknowledge in a processing system is deferred until the transfer of buffered data to be written from an agent on a subsystem I/O bus to main memory is assured. Where cache memories are used, the deferral of an interrupt acknowledge also ensures that any necessary cache coherency operations are performed before an interrupt acknowledge cycle is completed In the normal course of system operation, an agent on an I/O bus writes data to system or main memory. To expedite system operation, this data is buffered in an interface circuit such that a number of data writes by an I/O bus agent are accumulated before accessing a system bus to write the data to main memory. As soon as the data has been buffered in the interface circuit, the I/O bus agent is released and, from its perspective, the write operation is complete.

Accordingly, the I/O bus agent sends an interrupt to a processor on the system bus indicating that the write is complete. In the illustrated embodiment of the present invention, the processing system includes a tightly-coupled interrupt controller such that the agent does not need to own either the I/O bus or the system bus to generate the interrupt. The interrupted processor issues an interrupt acknowledge cycle wherein the interrupt controller generates an interrupt vector and passes it to the processor so that an appropriate interrupt service routine can be entered by the processor. Under the noted circumstances, it is possible for the interrupt acknowledge cycle to be completed leading to the performance of the interrupt service routine before data buffered in the interface circuit has been entered into the main memory. If this happens, data which is not up-to-date is used for the interrupt service routine.

To ensure that this does not happen, in accordance with the present invention the interface circuit monitors the system bus, recognizes an interrupt acknowledge cycle and generates a retry signal for the processor if buffered data remains in the interface circuit. In response to the retry signal, the processor is taken off the system bus and not allowed to regain the system bus until the buffered data is written to main memory. A bus busy signal is raised and will not be lowered until the data is written to main memory. When the busy signal is lowered, the processor regains the system bus and receives an appropriate interrupt vector from the interrupt controller. While no retry is issued this time, I/O bus ownership is locked until the interrupted processor has received an interrupt vector and the interrupt acknowledge cycle is complete. This ensures that an interrupt vector is not supplied for a higher priority interrupt as the result of another agent having gained control of the I/O bus and still having data buffered in the interface circuit.

If no buffered data to be written to main memory remains in the interface circuit, the interface circuit will not generate a retry signal for the processor. In this event, the interrupt controller waits a predefined period of time after the interrupt acknowledge cycle is initiated for generation of a retry signal by the interface circuit. If no retry signal is generated, none will be generated.

After the predefined period of time elapses with no retry signal, the interrupt controller issues an appropriate interrupt vector to the processor issuing the interrupt acknowledge to complete the interrupt acknowledge cycle. If more than one I/O bus is provided for a computer system, the described retry operation is performed preferably only on one of the buses referred to herein as a primary I/O bus with the flushing to main memory of buffered data in the remaining I/O bus interface circuits being ensured by forcing the processor(s) of the computer system to perform an I/O access to the additional I/O buses before using data from the main memory. If all I/O bus interface circuits retried interrupt acknowledge cycles, then all I/O buses would have to be arbitrated for, won and locked-up to ensure buffered data had been flushed to main memory, i.e. up-to-date data in the main memory for an interrupt service routine.

In accordance with one aspect of the present invention, a processing system comprises an independently arbitrated system bus having at least one processor and system memory coupled thereto. A tightly-coupled interrupt controller and an independently arbitrated first I/O bus are also coupled to the system bus. The first I/O bus hosts resident agents thereon as resources for the processing system. First I/O bus interface means are provided for coupling the first I/O bus to the system bus. The I/O bus interface means comprises buffering means for latching data to be written from the agents to the system memory and controller means. The controller means provides for controlling the buffering means and issuing a retry signal on the system bus in response to an interrupt acknowledge cycle generated by the processor if the buffering means contains latched data to be written to the system memory. The retry signal defers any action upon the interrupt acknowledge until all data latched in the buffering means has been written to system memory. The interrupt controller monitors the system bus and issues an interrupt vector in response to an interrupt acknowledge cycle if a retry signal is not issued by the first I/O bus interface means within a predetermined period of time.

The processing system may further comprise at least one independently arbitrated additional I/O bus coupled to the system bus. For such configurations, the additional I/O bus or buses host resident agents thereon as resources for the processing system and include additional I/O bus interface means for coupling the additional I/O bus or buses to the system bus. The additional I/O bus interface means comprises buffering means for latching data to be written from the agents on the additional I/O bus or buses to the system memory and controller means for controlling the buffering means of the additional I/O bus interface means.

In accordance with another aspect of the present invention, a processor system comprises at least one independently arbitrated system bus having at least one processor and system memory coupled to each system bus. A tightly-coupled interrupt controller and multiple independently arbitrated I/O buses are also coupled to the system bus. The I/O buses host resident agents thereon as resources for the processing system and include a primary I/O bus. I/O bus interface means couple the I/O buses to the system bus, the I/O bus interface means comprising buffering means for latching data to be written from the agents on the I/O buses to the system memory and controller means for controlling the buffering means. A portion of the I/O bus interface means is associated with the primary I/O bus and further provides for issuing a retry signal on the system bus in response to an interrupt acknowledge cycle generated by the processor if a portion of the buffering means associated with the primary I/O bus contains latched data to be written to the system memory. The retry signal defers any action on the interrupt acknowledge cycle until all data latched in the portion of the buffering means associated with the primary I/O bus has been written to system memory. The interrupt controller monitors the system bus and issues an interrupt vector in response to an interrupt acknowledge cycle if a retry signal is not issued by the portion of the I/O bus interface means within a predetermined period of time.

In accordance with yet another aspect of the present invention, a method of operating a processor system comprises the steps of: interconnecting at least one processor to a system bus; interconnecting system memory to the system bus; interfacing a first I/O bus to the system bus by means of first I/O bus interface means; coupling first agents to the first I/O bus such that the first I/O bus can connect the first agents to one another, to the processor, and to the system memory; independently arbitrating access to the system bus and the first I/O bus; packing data to be written into the system memory from agents coupled to the first I/O bus, the data being packed into the first I/O bus interface means; generating an interrupt signal upon a write operation performed by one of the first agents to the system memory; and, deferring interrupt acknowledge operations performed in response to the interrupt signal generated upon a write operation performed by one of the first agents to the system memory.

The method may further comprise the steps of: interfacing a second I/O bus by means of second I/O bus interface means to the system bus; coupling second agents to the second I/O bus such that the second I/O bus can connect the second agents to one another, to the processor, and to the system memory; independently arbitrating access to the second I/O bus; and, packing data to be written into the system memory from agents coupled to the second I/O bus, the data being packed into the second I/O bus interface means.

The first and second I/O bus interface means may also be used to handle data read from the system memory to the I/O bus agents such that the method may further comprise the step of pre-fetching data to be read from the system memory to agents coupled to the first and second I/O buses, the data being prefetched into the first and second I/O bus interface means. The step of deferring interrupt acknowledge operations may comprise the steps of: generating an interrupt acknowledge in response to the interrupt signal; receiving the interrupt acknowledge in the first I/O bus interface means which serves the first I/O bus to which an agent responsible for generating the interrupt signal resulting in the interrupt acknowledge signal is coupled; determining whether packed data in the first I/O bus interface means has been transferred to the system memory; and, generating a retry signal for the processor if packed data in the first I/O bus interface means has not been transferred to the system memory.

The step of deferring interrupt acknowledge operations may further comprise the steps of: monitoring the system bus for a predetermined period of time to determine whether a retry signal is generated; and, generating an interrupt vector if a retry signal is not received within the predetermined time period. In addition, the step of deferring interrupt acknowledge operations may further comprise the steps of: removing the processor which generated the interrupt acknowledge from the system bus; and, denying access to the system bus by the processor which generated the interrupt acknowledge until packed data in the first I/O bus interface means has been transferred to the system memory.

The step of denying access to the system bus by the processor which generated the interrupt acknowledge until packed data in the first I/O bus interface means has been transferred to the system memory may comprise the step of generating an I/O bus busy signal until all packed data in the first I/O bus interface means has been transferred to the system memory. To prevent improper servicing of interrupt acknowledge cycles, the method may further comprise the step of locking the first I/O bus after terminating the step of generating an I/O bus busy signal as a result of transferring all packed data from the first I/O bus interface means to the system memory to prevent another agent from gaining control of the first I/O bus until the interrupt acknowledge operations have been completed for the interrupt signal. The step of generating an I/O bus busy signal until all packed data has been transferred from the first I/O bus interface means to the system memory is performed by the first I/O bus interface means.

When the processor includes a cache memory, the step of generating an I/O bus busy signal is continued until all associated coherency operations are completed for the packed data which has been transferred to the system memory. The first I/O bus interface means issues retry signals to any processor attempting to access the first I/O bus or to do an interrupt acknowledge cycle until the first I/O bus busy signal is no longer being generated.

Thus it is an object of the invention of the present application to provide improved methods and apparatus for operating a processing system to ensure that only up-to-date data is used in the processing system; to provide improved methods and apparatus for operating a processing system to ensure that only up-to-date data is used in the processing system by deferring any response to an interrupt acknowledge in a processing system until the transfer of buffered data to be written from an agent on a subsystem I/O bus to main memory is assured; and, to provide improved methods and apparatus for operating a processing system to ensure that only up-to-date data is used in the processing system by issuing a retry signal to a processor attempting to complete an interrupt acknowledge cycle in response to an interrupt generated by an agent on a primary subsystem I/O bus writing data to system memory when that data may be buffered in an interface circuit.

Other objects and advantages of the invention will be apparent from the following description, the accompanying drawings and the appended claims.

DETAILED DESCRIPTION OF THE INVENTION

Figure 1A:
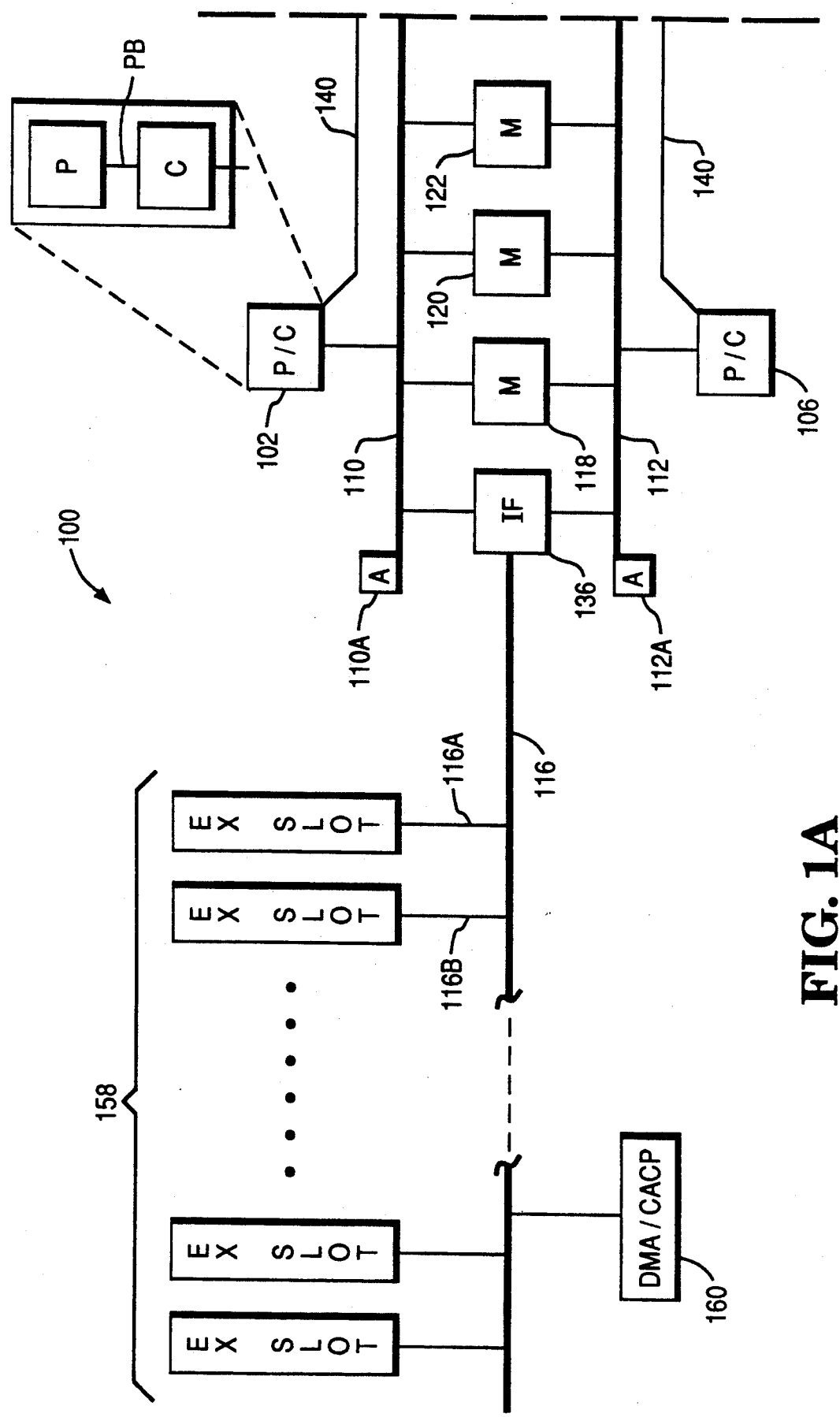
FIGS. 1A and 1B together form a block diagram of a multiple processor system operable in accordance with the present invention and including four processors, two system buses and two subsystem I/O buses interfaced to the system buses.

Reference will now be made to the drawing figures wherein FIGS. 1A and 1B together form a block diagram of a multiple processor system 100 operable in accordance with the present invention to ensure that only up-to-date data is used by the system. The multiple processor system 100 includes four processors 102, 104, 106, 108, two system buses 110, 112 and two subsystem I/O buses 114, 116 interfaced to the system buses 110, 112. The processors 102 and 104 are coupled to the system bus 110 and the processors 106 and 108 are coupled to the system bus 112 In the preferred embodiment, the system buses 110, 112 are non-multiplexed, tenured, burst buses. Tenured implies a master owns the bus for the duration of a data transfer and non- multiplexed implies separate physical address and data paths. Burst implies one address is put on a system bus and then groups of data bits, for example either 32 or 64 bits of data in the preferred embodiment, are transferred on each system bus clock until an entire memory data line is transferred.

The processors 102-108 are coupled to system or main memory which, in the illustrated embodiment, comprises four independent, dual ported memory interleaves 118, 120, 122 and 124 via the system buses 110, 112 which may also be denominated memory buses Interleaving is a memory partitioning scheme which interleaves linearly addressed memory lines across multiple memory resources, for example the memory interleaves 118, 120, 122 and 124. In the illustrated embodiment, each of the memory interleaves 118, 120, 122 and 124 includes four (4) banks of memory, bank 0–bank 3. Thus, in the four-way interleave shown in FIGS. 1A and 1B, line address 0 is mapped to bank 0, memory interleave 118; line address 1 is mapped to bank 0, memory interleave 120; line address 2 is mapped to bank 0, memory interleave 122; line address 3 is mapped to bank 0, memory interleave 124; line address 4 is mapped to bank 0, memory interleave 118; and so forth. While four memory interleaves are shown in the multiple processor system 100 of FIGS. 1A and 1B, any reasonable number of interleaves may be used in the disclosed architectures with from one to four being typical.

Also coupled to the system buses 110, 112 are a dual ported interrupt controller 126 and I/O bus interface means comprising dual ported I/O bus interface circuits 134 and 136 with the I/O bus interface circuit 134 interfacing the I/O bus 114 to the system buses 110, 112 and the I/O bus interface circuit 136 interfacing the I/O bus 116 to the system buses 110, 112. Operation of the interrupt controller 126 and the I/O bus interface circuits 134, 136 will be described hereinafter.

The I/O bus 114 is designated as the primary I/O bus and couples a video subsystem 138 to the multiple processor system 100. The video subsystem 138 is also directly coupled to the processors 102-108 via a video bus 140. A peripheral bus 142 is coupled to the I/O bus 114 and connects the multiple processor system 100 to standard peripheral devices 144, ROM/RAM 146, a diagnostic processor 148 and a configuration and test (CAT) controller 150 which also interfaces to the multiple processor system 100 via a CAT bus 152. A direct memory access (DMA) controller 154 which houses a central arbitration control point (CACP) for the I/O bus 114 is also coupled to the I/O bus 114 for direct memory access operations.

A number of expansion slots 156 are provided on the I/O bus 114 for interfacing a corresponding number of agents to the multiple processor system 100. For example, a preferred I/O bus for the multiple processor system 100 is commercially available from the IBM corporation under the name Micro Channel, which provides 8 expansion slots. Thus, by utilizing the architecture disclosed in the present application, a number of expansion slots corresponding to the I/O bus used in the multiple processor system 100 can be provided for a single load on the system bus, i.e. the system buses 110, 112. If the noted IBM I/O bus is used, 8 expansion slots are provided while other I/O buses will provide alternate numbers of expansion slots depending upon the selected I/O bus. The I/O bus 116 in the illustrated multiple processor system 100 provides an additional number of expansion slots 158 and also includes a DMA controller 160 with a CACP coupled to the I/O bus 116.

Figure 1B:
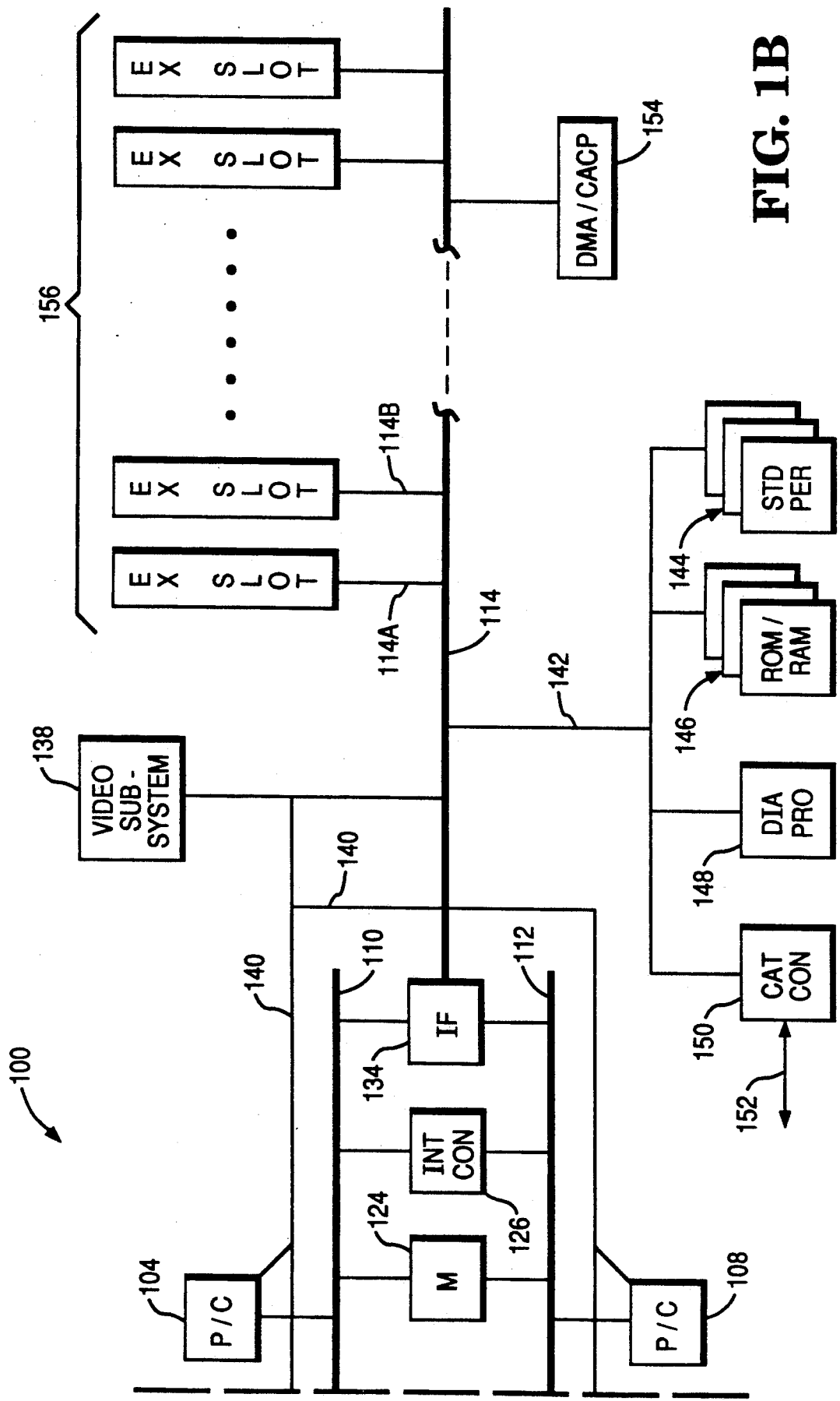

While four processors 102-108 are shown in the embodiment of FIGS. 1A and 1B, it is apparent that any reasonable number of processors can be used in the disclosed system architectures dependent upon a given application and the required processing power. In addition, dual processors can be provided in place of the single processors 102-108. The processors 102-108 preferably are 80486 processors which are commercially available from the Intel Corporation. In any event, the illustrated processors 102-108 comprise a processing unit P and a copy-back cache memory C which are interconnected by a processor bus PB as shown by the expansion of the processor 102 in FIG. 1A.

A copy-back cache keeps both read hits and write hits off the system bus or memory bus, i.e. the system buses 110, 112. A write hit modifies its internal cache entry and marks the line as modified in the cache memory. A global cache consistency protocol ensures that only one copy-back cache memory is allowed to own and freely modify a line without informing the system. Since the owner cache may have the only valid copy of a line of data, that cache must update the system memory when it replaces a modified line of data. The owner cache is also responsible for supplying the line contents in response to a request for the line from any other system device.

Figure 2:
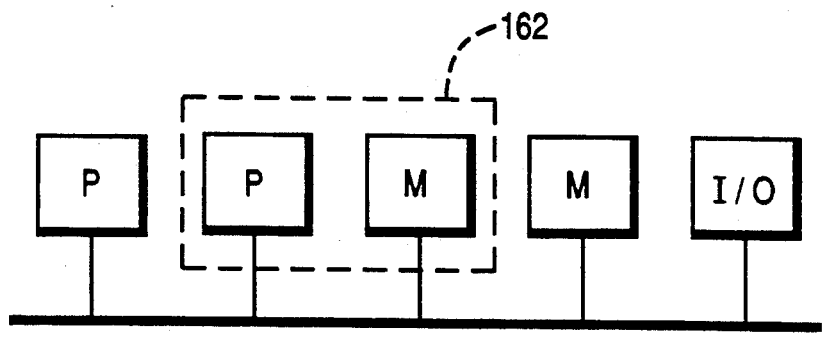
FIGS. 2 and 3 are block diagrams of down-scaled configurations of the multiple processor system of FIGS. 1A and 1B.
Figure 3:
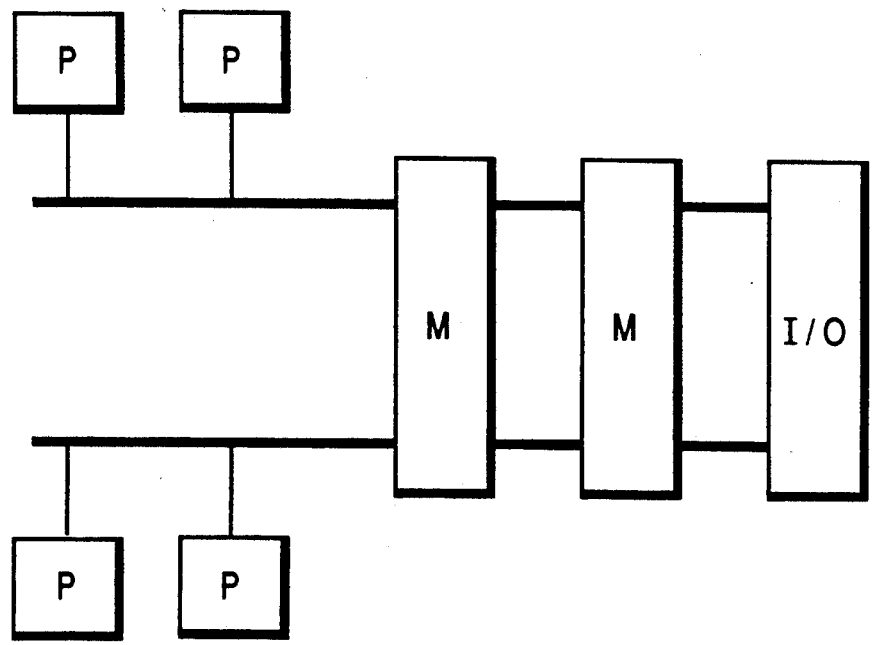
Figure 4:
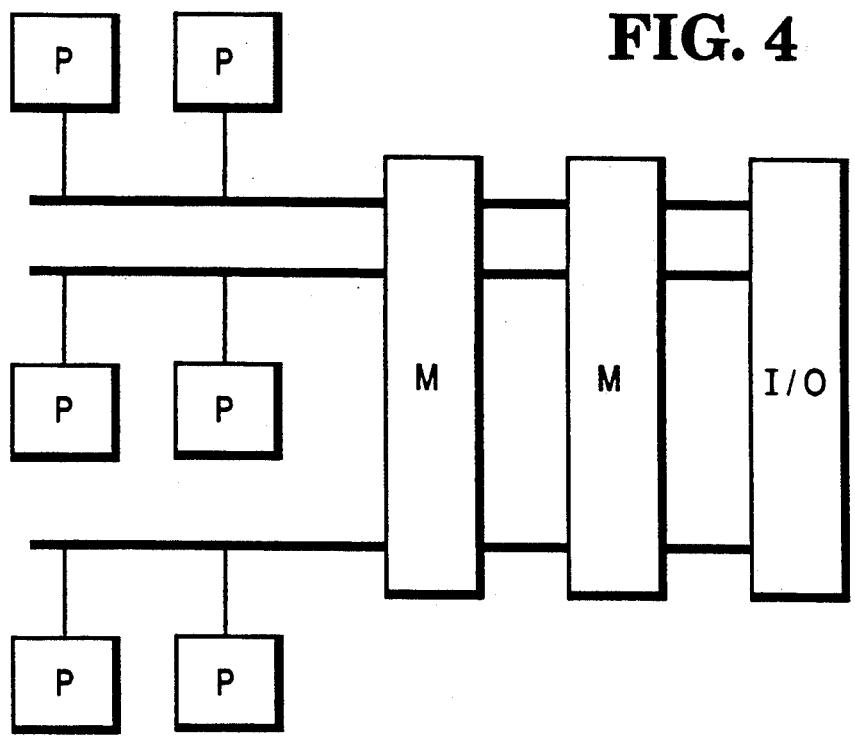
FIGS. 4 and 5 are block diagrams of up-scaled configurations of the multiple processor system of FIGS. 1A and 1B;.
Figure 5:
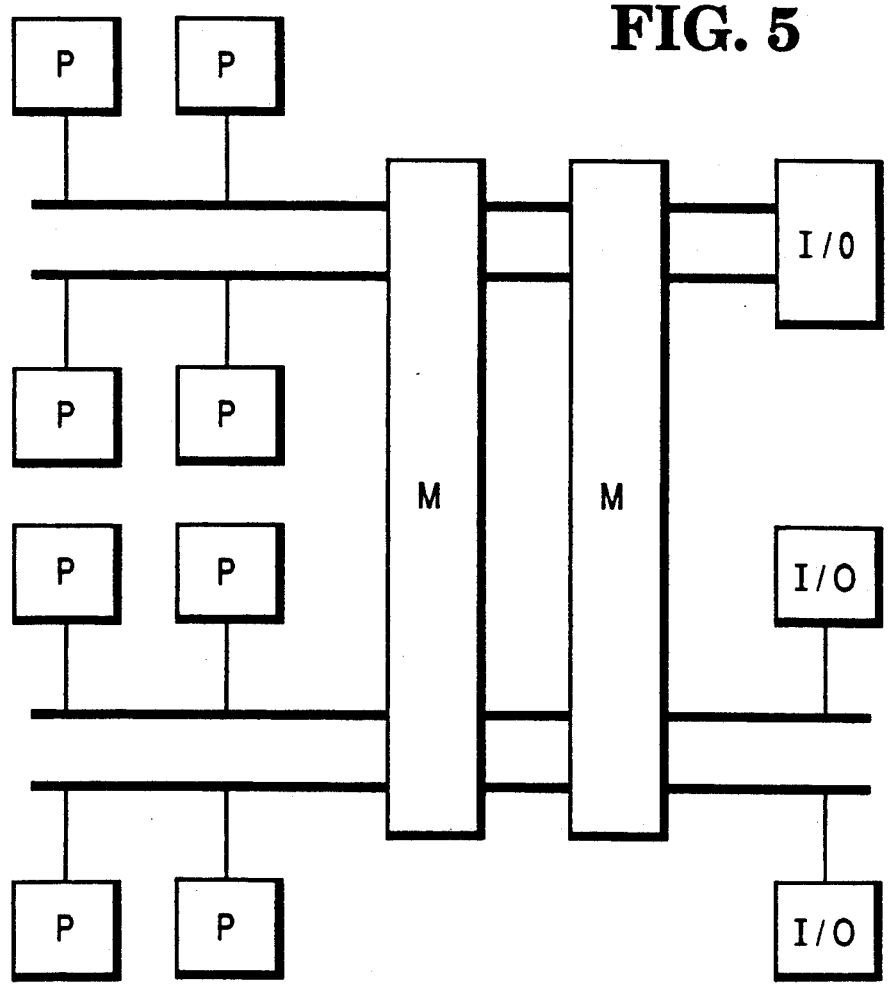

The configuration of FIGS. 1A and 1B can be up-scaled, for example to the configurations of FIGS. 4 and 5 or down-scaled, for example to the configurations of FIGS. 2 and 3, with the ultimate down-scaling being to a system 162 having one bus with one processor and one ported memory as shown in the dotted line box of FIG. 2. Configurations range from this simplest case of one bus and one ported memory with one or more processors to N buses with N ported memories with one or more processors connected to each of the N buses. In particular, FIGS. 2-5 show a unibus system, a dual bus system, a tribus system and a quadbus system, respectively. Note that in general the I/O buses can either be ported across all N system buses or else ported across some number of the system buses less than N. In the latter case, the N ported memory would implement intelligent decoder and busto-bus bridge services in hardware to ensure all processors have an identical view of I/O resources.

An important feature of the disclosed multiple processor computer system architectures is that the system buses 110, 112 and the I/O buses 114, 116 are independently arbitrated system resources, i.e. the multiple processor system 100 includes a decoupled bus structure. Independent arbitration is performed for all system and I/O buses for all system configurations. For example, in the illustrated embodiment of FIGS. 1A and 1B, the system buses 110, 112 each include their own arbitration circuitry 110A, 112A as a part of the bus system, with arbitration being performed in accordance with well known arbitration strategies based, for example, on assigned priority levels. Similarly, arbitration of the I/O buses 114, 116 is independently performed in accordance with well known arbitration strategies.

Thus, when an agent arbitrates to become owner of the I/O bus to which it is connected, the agent wins ownership only of that I/O bus. Only when an I/O bus interface circuit decodes that an agent wants to access the main memory does it arbitrate for a system bus and run a memory cycle. An agent can therefore communicate with other agents on its I/O bus while the processors of a multiple processor system still have complete access to the memory interleaves over the system bus, i.e. the system buses 110, 112 in the multiple processor system 100 of FIGS. 1A and 1B.

Figure 6:
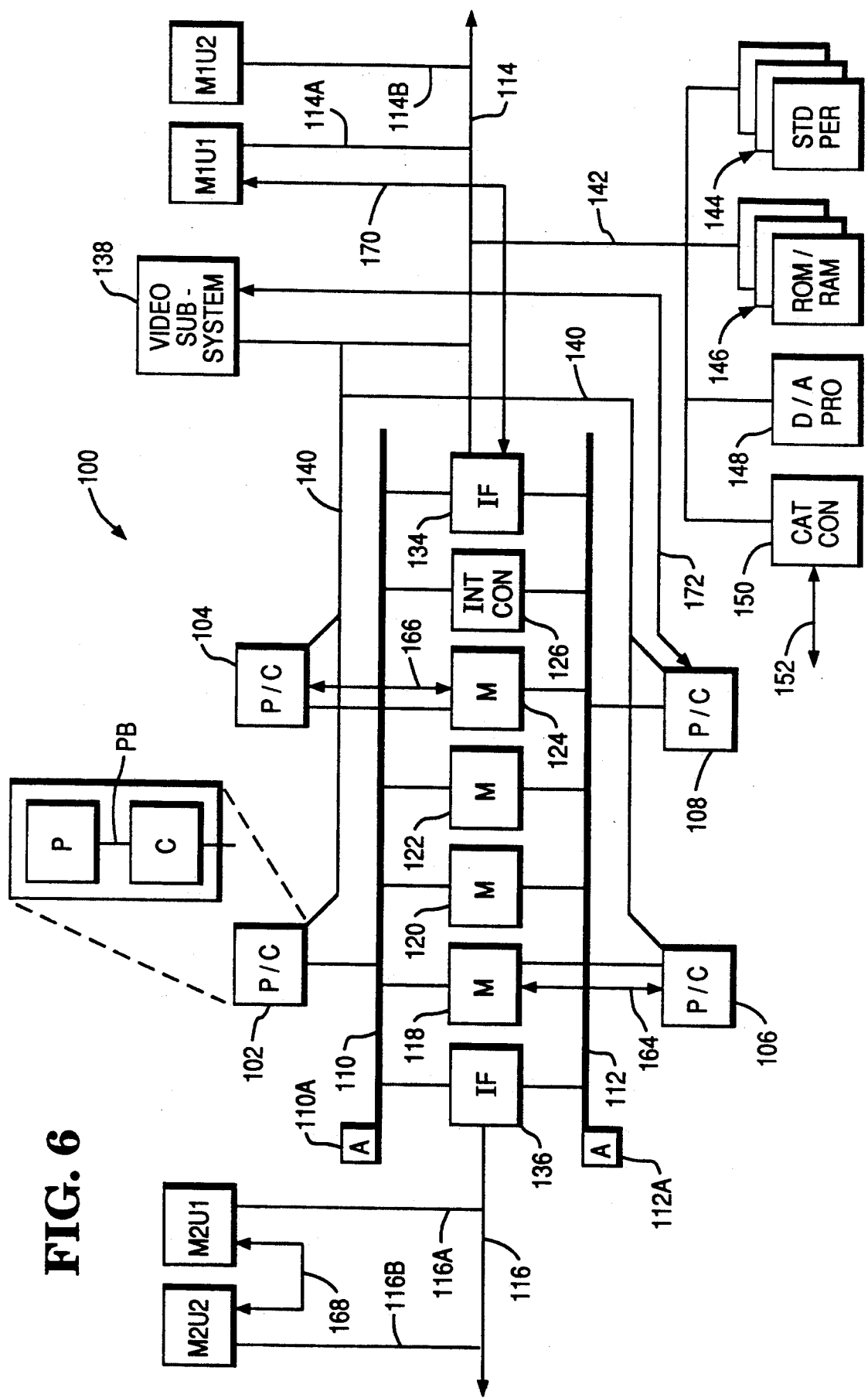
FIG. 6 is a block diagram of the multiple processor system of FIGS. 1A and 1B illustrating operations which can be performed simultaneously on that system.

The block diagram of FIG. 6 illustrates how the decoupled bus structure of the disclosed architectures facilitates operations within the multiple processor system 100 by means of the many possible concurrent operations which can be performed. For example, as shown in FIG. 6, the processor 106 is coupled to the memory interleave 118 via the system bus 112 through a path 164 while the processor 104 is coupled to the memory interleave 124 via the system bus 110 through a path 166.

In addition, the following system operations are also taking place concurrently with the operations of the processors 106, 104: two I/O bus agents M2U1 and M2U2 are coupled to one another via the I/O bus 116 through a path 168; a bus agent M1U1 is coupled to the I/O bus interface circuit 134 via the I/O bus 114 through a path 170, perhaps awaiting availability of one of the system buses 110, 112 for a memory operation; and, the processor 108 is coupled to the video subsystem 138 via the video bus 140 through a path 172. Of course, the paths 164-172 are merely representative of the numerous concurrent paths through the multiple processor system 100 illustrative of the architectures disclosed in the present application. It is apparent that the decoupled bus structure together with the use of memory interleaves and cache memories minimizes use of the system bus and memory of systems configured in accordance with the disclosed architectures in addition to enabling concurrent operation of the system processors and agents resident on the I/O buses.

An additional feature of the disclosed multiple processor systems is that they enable agents on the I/O buses to run at substantially full speed when moving data to or from the main memory, i.e. the memory interleaves 118-124 of FIGS. 1A and 1B. To that end, the I/O bus interface circuits 134, 136 are arranged to supply data read from main memory as fast as an agent can receive it once the data is received by the I/O bus interface circuits 134, 136, and to receive data written to the main memory as fast as an agent can supply it. This not only improves each agent's performance, but also lowers each agent's utilization of I/O bus bandwidth. Lower utilization of I/O bus bandwidth allows more agents to be serviced by an I/O bus and reduces processor latency when accessing I/O bus resources, i.e. agents on the I/O buses.

Data exchanges between agents on an I/O bus and the main memory or memory interleaves of multiple processor systems of the present application will now be described with reference to FIG. 7 which is a schematic block diagram of the I/O bus interface circuit 134 of FIG. 1B. Since the I/O bus interface circuits 134, 136 are very similar to one another and can be substantially identical, only the I/O bus interface circuit 134 will be described herein. Maximum efficiency is achieved when the I/O bus interface circuits 134, 136 use the system bus's full line (16 or 32 byte) burst read and write cycles. These cycles optimally exploit the interleaved memory architecture, which in turn is optimized for transactions between the memory interleaves and processor copy-back caches.

For the I/O bus interface circuits 134, 136 to accommodate the system bus's full line burst read and write cycles, data is buffered in the I/O bus interface circuits 134, 136. For Writes, a number of writes by an I/O bus agent are accumulated in buffering means comprising at least one buffer register, and for reads, at least one line of data from the system memory is read into the same buffering means. The read and write buffering operations exploit the fact that most I/O bus agents or masters are "block oriented", i.e. data moves are typically large, relatively well organized and progress in linearly ascending address order. This is particularly useful for the I/O bus's streaming mode protocols, which are by definition homogeneous, i.e. a single data stream is either all reads or all writes, and constrained to linearly ascending address order.

Figure 7:
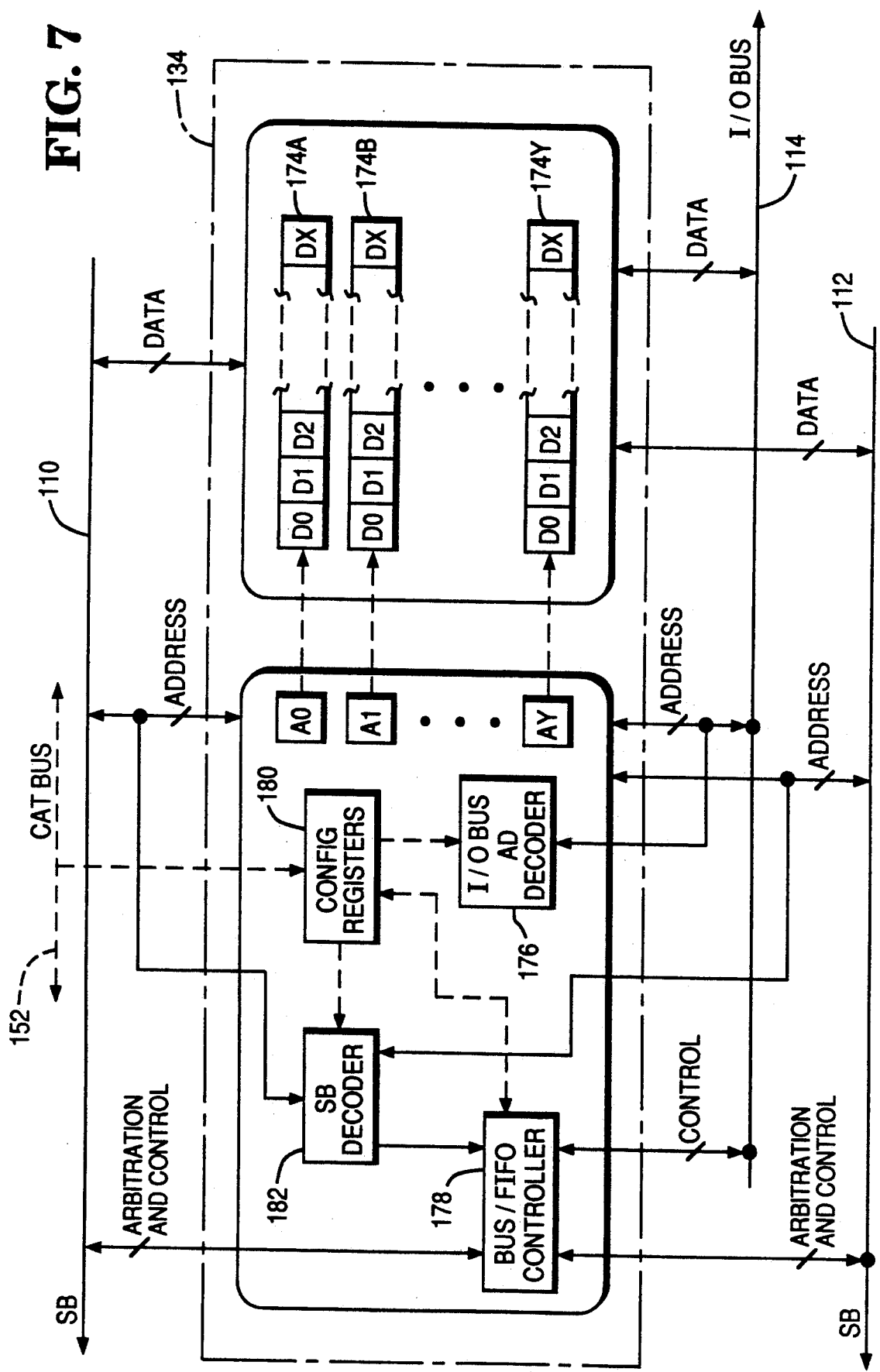
FIG. 7 is a schematic block diagram of an I/O bus interface circuit of the multiple processor system of FIGS. 1A and 1B.
Figure 8:
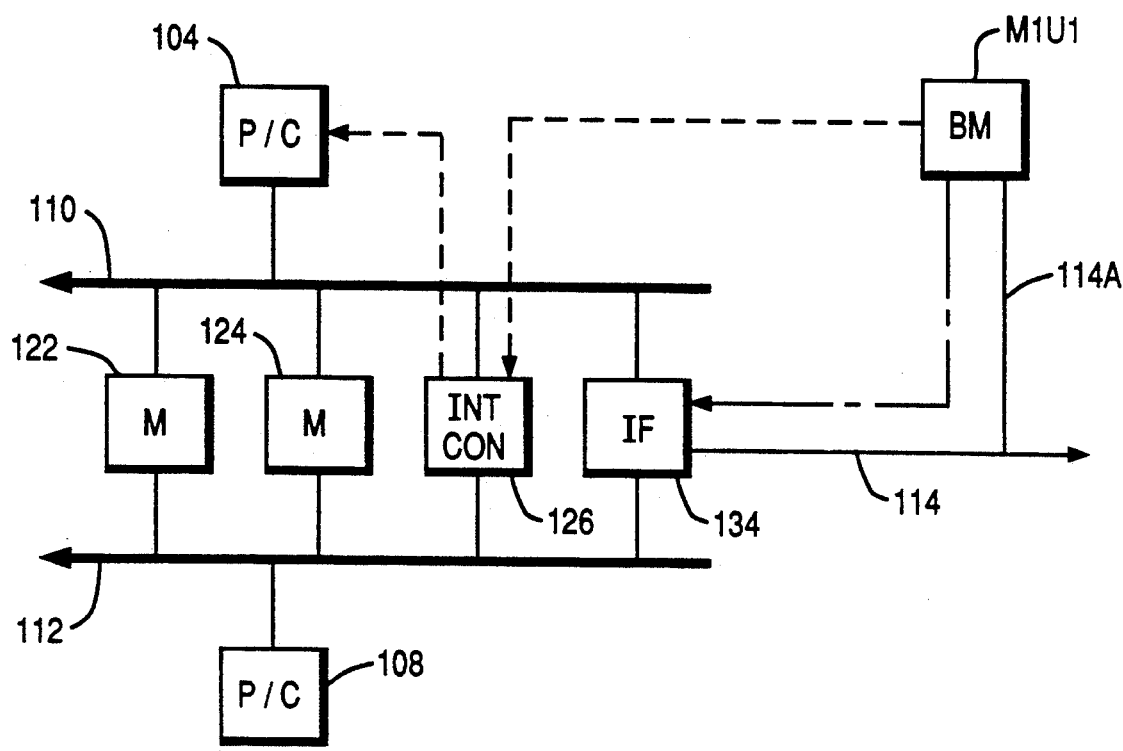
FIGS. 8-11 which show a portion of the multiple processor system of FIGS. 1A and 1B to illustrate operation of the system in accordance with the present invention to ensure that only up-to-date data is used.
Figure 9:
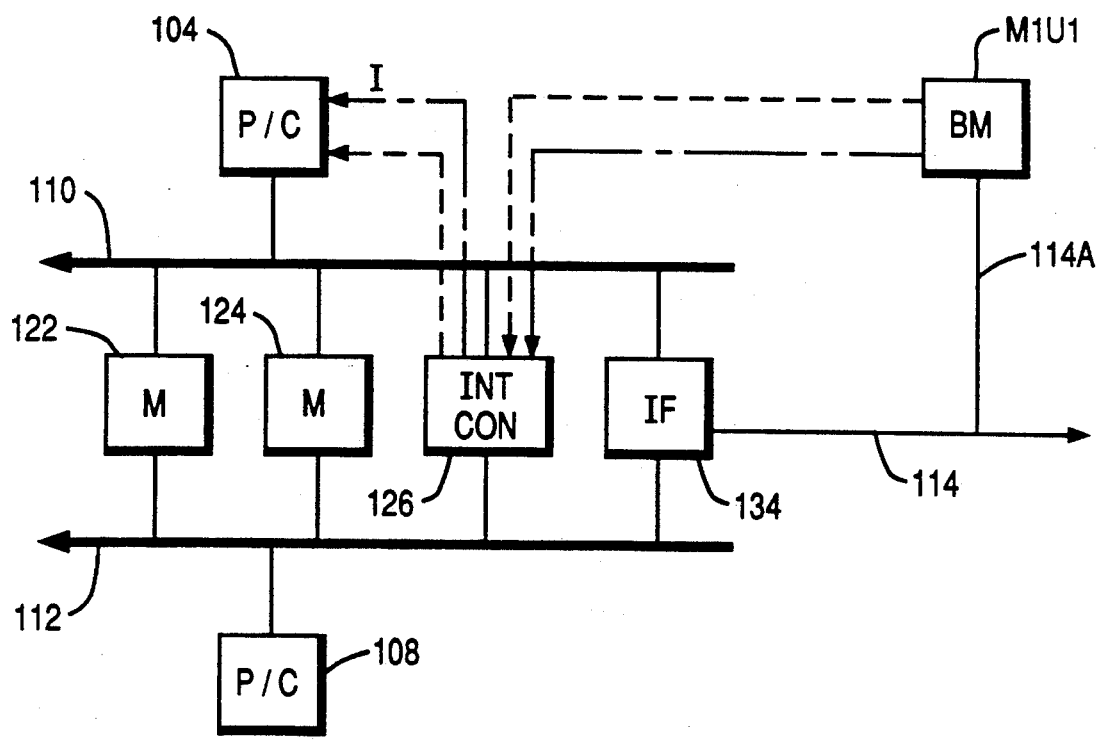
Figure 10:
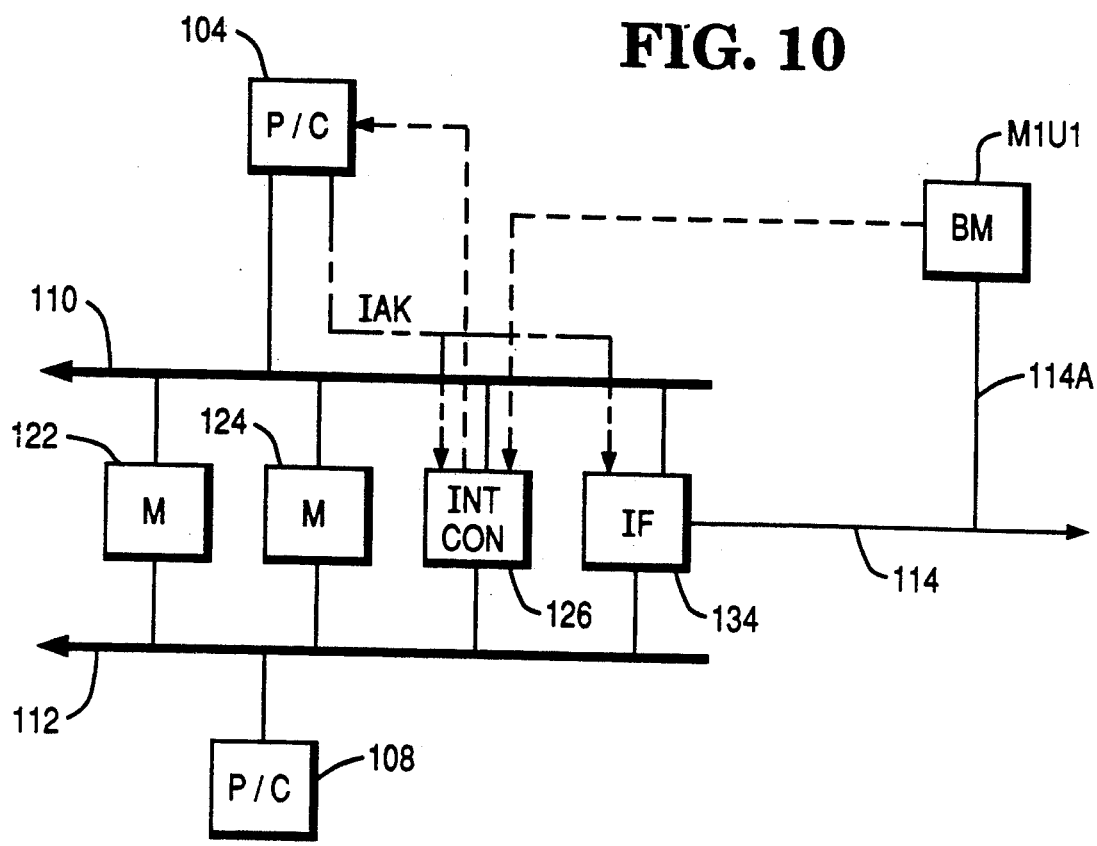

In the embodiment of the I/O bus interface circuit 134 shown in FIG. 7, the buffer registers comprise first-in-first-out (FIFO) registers 174A-174Y. Each of the FIFO registers 174A-174Y comprises X+1 data words, D0-DX, and store an entire memory line of data, either 128 or 256 bits in the illustrative embodiment. For example, X can be equal to 7 such that 8 data words of 16 bits or 32 bits each are stored in each FIFO register 174A-174Y for a 128 or 256 bit line of data, respectively.

When an I/O bus address decoder 176 of the I/O bus interface circuit 134 decodes a bus master write to main memory, the write is not immediately propagated to the system bus, i.e. one of the system buses 110, 112. Rather the data is latched in the I/O bus interface circuit 134, more particularly into the FIFO registers 174A-174Y and the bus master cycle terminated immediately. Thus, the I/O bus interface circuit 134 accepts the data as fast as the agent which is the current bus master supplies it. Now assume the master continues running writes in linear address order, or else initiates a stream. The I/O bus interface circuit 134 continues to latch data without delay until an entire line, 16 or 32 bytes depending on the system configuration, is captured or "packed" in one of the FIFO registers 174A-174Y or "line buffers".

Only then does a bus/FIFO controller 178 of the I/O bus interface circuit 134 arbitrate for the system bus, i.e. one of the system buses 110, 112, and propagate the data to the main memory or memory interleaves 118-124 as a single write line burst. Meanwhile, another FIFO register or line buffer in the I/O bus interface circuit 134 continues to accept and pack data from the master without interruption.

In a preferred embodiment of the multiple processor system 100 of FIGS. 1A and 1B, the I/O bus interface circuits 134, 136 have either 4 or 8 FIFO registers or line buffers, depending on the system configuration, such that Y would be equal to 3 or 7, of course any reasonable number of FIFO registers can be used as required for a given application. In this way, the FIFO registers 174A-174Y are continuously filled by the master, emptied to the main memory via the system bus, and then made available again for new data. The line buffers or FIFO registers 174A-174Y continue to roll over indefinitely causing no delays to the master, unless the system bus falls sufficiently behind so that all the buffers fill before one can be emptied. In this case the master is stalled until a register or line buffer becomes available.

The term "packing" implies that multiple bus master cycles are assembled into a single system bus burst write For example, 8 cycles of a 32-bit master will be packed into a single system bus write for a line size of 32 bytes. Preferably, the line size matches that of the system cache memories such that there will be at most one cache coherency operation associated with the 8 bus master cycles. In the case of a 16-bit master, 16 of its cycles will be packed into a single system bus write.

When the I/O bus address decoder 176 of the I/O bus interface circuit 134 decodes a bus master read from main memory, it stalls the master and immediately arbitrates for the system bus. Once one of the system buses 110, 112 is won, the I/O bus interface circuit 134 fetches an entire data line from main memory in a single burst read and stores it locally in a line buffer or one of the FIFO registers 174A-174Y. The data requested by the master is driven onto the I/O bus 114 and the master is released. If the master continues reading in linear address order, or else initiates a stream, the I/O bus interface circuit 134 then supplies data out of its line buffer with no delays.

Anticipating that the master will continue to request data in linearly ascending order, the I/O bus interface circuit 134 may initiate additional system bus burst reads, i.e. read-aheads or prefetches, that fill additional line buffers or ones of the FIFO registers 174A-174Y. Thus, the I/O bus interface circuit 134 attempts to anticipate the master and have the desired data ready and waiting locally when the master requests it. The I/O bus interface circuit 134 can be selectively configured to prefetch 1 line of data or up to the number of lines of data corresponding to the number of line buffers or FIFO registers 174A-174Y from the main memory, for example, 1, 2, 4 or 8 lines of data may be prefetched based on the arbitration level of the bus agent or master performing the memory read. The number of lines which are prefetched are correlated to the bus agents such that the number of lines prefetched corresponds to the number of lines which are typically read by the agent.

Unlike the write operation of the I/O bus interface circuit 134, the first bus master read is stalled while the I/O bus interface circuit 134 fetches the first line of data from main memory. However, in the case of a 32-bit master and a 32 byte line size, the next 7 cycles are serviced from a line buffer or one of the FIFO registers 174A-174Y without delay. Accordingly, the time losses associated with stalled reads are efficiently amortized over a much larger number of non-delayed reads such that average read latency is low.

A method and apparatus in accordance with the present invention for operating the disclosed multiple processor architectures in a manner to ensure that only up-to-date data is used will now be described. The high performance multiple processor architectures disclosed in the present application include storage of data to be written to the main memory in the I/O bus interface circuits 134, 136 as described. This storage of write data in the I/O bus interface circuits 134, 136 ensures that data is accepted as fast as the agent which is the current bus master can supply it; however, until it is written to main memory, the data contained in the main memory is not up-to-date. Copy-back cache memories also may contain the only accurate copies of data rather than the main memory. In addition, the interrupt controller 126 of the disclosed multiple processor systems is tightly-coupled, i.e. the interrupt controller 126 can be quickly accessed by agents resident on the I/O buses 114, 116 and the processors 102-108 resident on the system buses 110, 112 without having to gain access to or own an I/O bus or a system bus, see FIGS. 8-11.

Accordingly, in the high performance architectures disclosed in the present application, one must ensure that data written by a bus agent to main memory has reached main memory and is not still propagating through the FIFO registers 174A-174Y of the I/O bus interface circuits 134, 136 before an interrupt is processed. Further, one must ensure that any cached copies of target memory locations are either invalidated or updated before an interrupt is serviced. Otherwise, an interrupt service routine (ISR) may be invoked in response to an interrupt acknowledge cycle and process data from the main memory which is not up-to-date.

Reference will now be made to FIGS. 8-11 which each show a portion of the multiple processor system 100 of FIGS. 1A and 1B to illustrate operation of the multiple processor system 100 in accordance with the present invention to ensure that only up-to-date data is used. When an I/O bus master M1U1 writes to main memory, the FIFO registers 174A-174Y of the I/O bus interface circuit 134 latch the address/data and immediately release the master M1U1, i.e. the master M1U1 does not have to wait for the data to reach main memory before its cycle is terminated, see FIG. 8.

As soon as the write cycle of the bus master M1U1 is terminated, from the perspective of the bus master M1U1 the write is complete and it generates an interrupt signal indicating completion of the write cycle to an associated processor, shown in FIGS. 8-11 to be the processor 104. Since the interrupt controller 126 resides on the system bus and can be accessed concurrently with I/O bus master activity, the interrupt (I) is passed to the processor 104, see FIG. 9, which generates an interrupt acknowledge (IAK) cycle on the system bus 110 to fetch an interrupt vector from the interrupt controller 126 such that the processor 104 can perform a corresponding interrupt service routine (ISR), see FIG. 10. In accordance with the present invention, servicing of the IAK cycle is deferred to ensure that only up-to-date data is used by the systems disclosed in the present application.

Figure 11:
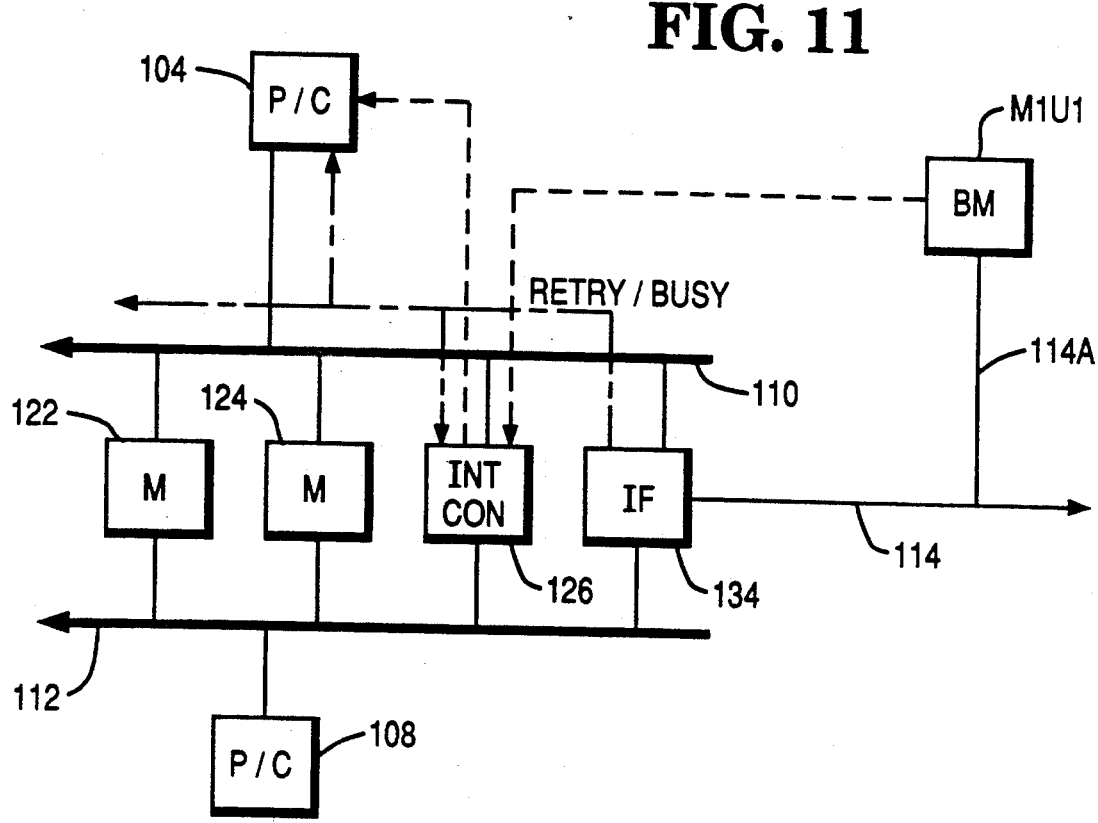

When a processor, such as the processor 104, issues an IAK cycle on the system bus, such as the system bus 110, in response to an interrupt request from a bus master, such as the bus master M1U1, if the system bus is not the current owner of the I/O bus, such as the I/O bus 114, i.e. the I/O bus is owned by some other bus master and thus data to be written to main memory may be resident in the FIFO registers 174A-174Y, the appropriate I/O bus interface circuit, here the I/O bus interface circuit 134, issues a retry signal to the processor for the IAK cycle as if the I/O bus interface circuit was the selected slave rather than the interrupt controller 126 and the I/O bus interface circuit raises a busy signal, see FIG. 11. The interrupt controller 126 monitors the system bus to detect the retry signal issued by the I/O bus interface circuit, and waits a period of time corresponding to a predetermined number of clock cycles before responding as slave to the IAK cycle and returning an appropriate interrupt vector. If the interrupt controller 126 does not see a retry signal during the wait time period, the I/O bus interface circuit 134 is not going to issue a retry signal and accordingly, the interrupt controller 126 supplies the appropriate interrupt vector and terminates the IAK cycle normally.

The retry signal causes the processor 104 to get off the system bus, its IAK cycle still pending. The system bus arbitration circuitry 110A, 112A will not allow the processor onto the system bus again until the I/O bus interface circuit removes its busy signal. Eventually the system bus acquires ownership of the I/O bus; however, the I/O bus interface circuit will not remove its busy signal until all bus master to main memory writes still pending in its FIFO registers 174A-174Y from the previous owner are completed and all associated coherency operations are complete. The I/O bus interface circuit 134 monitors the system bus to determine when coherency operations are complete. Until the I/O bus interface circuit 134 removes its busy signal, it will continue to issue retry signals in response to any attempt by any other processor to access the I/O bus or to do an IAK cycle.

When the I/O bus interface circuit 134 finally removes its busy signal, the arbitration circuitry 110A, 112A enables the processor 104 that originally attempted the IAK cycle to reissue the cycle. This time, since the I/O bus interface circuit 134 is not busy it does not issue a retry signal, and the interrupt controller 126 supplies an interrupt vector and terminates the cycle. Although in this case the I/O bus interface circuit does not issue a retry signal, it does "lock" I/O bus ownership and will not surrender it to another master until the I/O bus interface circuit 134 detects that the interrupt controller 126 has successfully supplied an interrupt vector to the processor 104 and terminated the IAK cycle. This procedure protects against the possibility of another I/O bus agent gaining ownership of the I/O bus as master, issuing a memory write to the I/O bus interface circuit 134, and then issuing a higher priority interrupt before the pending IAK completes. If bus ownership by another master was allowed to occur, there is a possibility that the interrupt controller 126 would supply an interrupt vector for the higher priority interrupt, even though its associated data is still in the FIFO registers 174A-174Y of the I/O bus interface circuit 134. System performance can be enhanced and deadlocks can be avoided by handling non-IAK cycles to a busy I/O bus in a manner similar to the handling of IAK cycles as just described.

While all I/O bus interface circuits of a system, such as the I/O bus interface circuits 134, 136 of the multiple processor system 100, can be configured to retry processors issuing interrupt acknowledge (IAK) cycles when buffered data is resident in the interface circuits, such operation can delay performance of the system. System delay results if all I/O bus interface circuits retry IAK cycles since then all I/O buses would have to be arbitrated for, won and locked-up to ensure that all buffered data has been flushed to main memory before an IAK cycle was completed. Accordingly, it is preferred in the present invention to provide the described IAK retry operations only for the I/O bus interface circuit 134 for the primary I/O bus 114. Flushing of data from any additional I/O buses, such as the I/O bus 116, is ensured by having the processor or processors of a system perform an I/O access to any additional I/O buses which, though slower than the IAK retry operation of the I/O bus interface circuit 134, ensures any resident data is flushed to main memory.

Methods and apparatus for interfacing multiple decoupled I/O buses to a common system bus in processor systems disclosed in the present application will now be described with reference to the preferred I/O bus, IBM's Micro Channel; however, it should be understood that this aspect of the processor systems of the present application is generally applicable to whatever I/O bus may be selected for use in a given processor system. The benefits of using multiple decoupled I/O buses, among others, include greater configurability for a processor system such as one of the illustrated multiple processor systems of the present application since each added I/O bus will support a corresponding number of expansion slots, for example 8 in the case of the preferred I/O bus.

Since the I/O buses are independent and buffer read/write main memory data, the achievable I/O data rate grows linearly with the addition of each I/O bus. Additional I/O buses can be added as I/O bandwidth and capacity requirements grow. Also, since each additional I/O bus is independently buffered, there are no inherent electrical loading issues associated with adding I/O buses apart from 1 extra load on the system bus for each I/O bus. For example, with the use of a Micro Channel I/O bus, 1 extra system bus load provides capacity for 8 additional I/O agents. In the multiple processor systems disclosed in the present application, it is noted that each I/O bus has it's own I/O bus interface circuit and DMA with included CACP.

Two decoding arrangements are utilized to interface multiple I/O buses to a computer system bus, used herein to accommodate multiple I/O buses in multiple processor systems: a programmable decoder that partitions available memory and I/O space among I/O buses; and, an address translator that keeps hardware, such as off-the-shelf third party agents as well as the DMA/CACP, on each I/O bus from having to comprehend the existence of more than one I/O bus.

Each I/O bus interface circuit for the I/O buses, such as the I/O bus interface circuit 134 illustrated in FIG. 7, includes a set of I/O bus configuration registers 180. Some of the I/O bus configuration registers 180 define the memory and I/O addresses to which the I/O bus will respond. During system configuration, the corresponding ones of the configuration registers 180 of the I/O bus interface circuit 134 associated with each I/O bus are loaded via the CAT bus with the specific address ranges for the corresponding I/O bus. In this way, available memory and I/O space is partitioned among the multiple I/O buses. Specific address registers provided within the configuration registers 180 of the illustrated embodiment include: a Top/Bottom of I/O bus Memory register, TOM/BOM, to specify the range of memory addresses allocated to a particular I/O bus; a Top/Bottom of I/O addresses register, TIO/BIO, to specify the range of I/O addresses allocated to a particular I/O bus; a ROM expansion register to specify which of the 8K wide expansion ROM slices in the 768K to 896K range are allocated to a particular I/O bus; and, an 8M–16M local bits register to specify which of the 1M slices in the 8M–16M range are allocated to a particular I/O bus to support 24-bit address bus agents.

There are certain fixed addresses associated with available I/O bus hardware. In the IBM Micro Channel hardware, all of these fixed addresses reside in the lowest 512 byte block of I/O space. For example, I/O ports 0100$h$–0107$h$ are reserved for configuring agents. When an agent is put into setup mode, it responds to this range of I/O address space and this range only for configuration purposes. Since all agents use the same range of I/O address space, a system bus address decoder 182 is provided to distinguish agents on different I/O buses, yet at the same time ensure all agents on all I/O buses still see the same range of I/O address space. A programmable address translation arrangement is provided in the I/O bus interface circuit 134 by means of a dedicated translation register within the configuration registers 180. At the time of system configuration, the dedicated translation register in each I/O bus interface circuit 134 is loaded via the CAT bus with a base value used to decode or translate accesses to these fixed addresses.

For example, assume the I/O interface circuits 134, 136, which are respectively connected to the I/O buses 114, 116, as shown in FIGS. 1A and 1B, have translation base values of 0000$h$ and 0400$h$ for their system bus address decoders. The system bus address decoder 182 of the I/O bus 114, as shown in FIG. 7, with a translation base value 0000$h$ responds to the 512 byte block starting at 0000$h$. When a processor configures agents on this I/O bus, it does so through ports 0100$h$–0107$h$ per I/O bus definition. To configure agents on the second I/O bus 116, it does so through ports 0500–0507$h$, i.e. same offset into the 512 byte block, but now relative to 0400$h$ instead of 0000$h$. However, the system bus address decoder of the I/O bus interface circuit 136 of the second I/O bus 116 (this decoder is not shown but is substantially the same as the system bus address decoder 182 shown in FIG. 7) strips out the offset before propagating the cycle onto the second I/O bus 116 so that agents on the second I/O bus 116 still see configuration cycles at 0100$h$–0107$h$.

Having thus described the invention of the present application in detail and by reference to preferred embodiments thereof, it will be apparent that modifications and variations are possible without departing from the scope of the invention defined in the appended claims.

What is claimed is:
1. A processing system comprising:
an independently arbitrated system bus;
a processor coupled to said system bus;
system memory coupled to said system bus;
an interrupt controller coupled to said system bus;

an independently arbitrated first I/O bus coupled to said system bus, said first I/O bus hosting a resident agent thereon as a resource for said processing system; and first I/O bus interface means for coupling said first I/O bus to said system bus, said I/O bus interface means comprising buffering means for latching a block of data to be written from said agent to said system memory and controller means for controlling said buffering means and issuing a retry signal on said system bus in response to an interrupt acknowledge generated by said processor if said buffering means contains any portion of the block of data to be written to said system memory thereby deferring acting upon said interrupt acknowledge until all of the block of data latched in said buffering means has been written to system memory, wherein said agent is able to cause an interrupt signal to be delivered to said processor so that said processor generates the interrupt acknowledge before all of the block of data is written to said main memory.

2. A processing system as claimed in claim 1 further comprising at least one independently arbitrated additional I/O bus coupled to said system bus, said additional I/O bus hosting resident agents thereon as resources for said processing system; and at least one additional I/O bus interface means for coupling said additional I/O bus to said system bus, said additional I/O bus interface means comprising buffering means for latching data to be written from the agents on said additional I/O bus to said system memory and controller means for controlling said buffering means of said additional I/O bus interface means.

3. A processing system as claimed in claim 1 wherein said interrupt controller monitors said system bus and issues an interrupt vector in response to the interrupt acknowledge if the retry signal is not issued by said first I/O bus interface means within a predetermined period of time.

4. A processor system comprising:
at least one independently arbitrated system bus;
a processor coupled to each system bus;
system memory coupled to each system bus;
an interrupt controller coupled to said system bus;
multiple independently arbitrated I/O buses coupled to said system bus, each of said I/O buses hosting a resident agent thereon as a resource for said processing system and comprising a primary I/O bus; and I/O bus interface means for coupling said I/O buses to said system bus, said I/O bus interface means comprising buffering means for latching data to be written from each of said agents on said I/O buses to said system memory and controller means for controlling said buffering means, a portion of said I/O bus interface means associated with said primary I/O bus further providing for issuing a retry signal on said system bus in response to an interrupt acknowledge generated by said processor if the buffering means associated with said portion of said I/O bus interface means contains latched data to be written to said system memory thereby deferring acting upon said interrupt acknowledge until all data latched in the buffering means associated with said portion of said I/O bus interface means has been written to system memory, wherein the agent hosted on said primary I/O bus is able to cause an interrupt signal to be delivered to said processor so that said processor generates the interrupt acknowledge before all data latched in the buffering means associated with said portion of said I/O bus interface means is written to system memory.

5. A processing system as claimed in claim 4 wherein said interrupt controller monitors said system bus and issues an interrupt vector in response to the interrupt acknowledge if the retry signal is not issued by said portion of said I/O bus interface means within a predetermined period of time.

6. A method of operating a processor system comprising the steps of:
interconnecting a processor to a system bus;
interconnecting system memory to said system bus;
interfacing a first I/O bus to said system bus by means of first I/O bus interface means;
coupling a first agent to said first I/O bus such that said first I/O bus can connect said first agent to said processor, and to said system memory;
independently arbitrating access to said system bus and said first I/O bus;
packing data to be written into said system memory from said first agent coupled to said first I/O bus, said data being packed into said first I/O bus interface means;
generating an interrupt signal by said first agent so as to cause said processor to generate an interrupt acknowledge upon a write operation performed by said first agent to said system memory but before data to be written from said first agent to said system memory is received by said system memory; and
deferring acting upon said interrupt acknowledge, said deferring step being initiated in response to detection of the interrupt acknowledge generated by the processor when packed data is present in said first I/O bus interface means.

7. A method of operating a processor system as claimed in claim 6 further comprising the steps of:
interfacing a second I/O bus by means of second I/O bus interface means to said system bus;
coupling second agents to said second I/O bus such that said second I/O bus can connect said second agents to one another, to said processor, and to said system memory;
independently arbitrating access to said second I/O bus; and
packing data to be written into said system memory from agents coupled to said second I/O bus, said data being packed into said second I/O bus interface means.

8. A method of operating a processor system as claimed in claim 7 further comprising the step of prefetching data to be read from said system memory to agents coupled to said first and second I/O buses, said data being prefetched into said first and second I/O bus interface means.

9. A method of operating a processor system as claimed in claim 7 wherein said deferring step comprises the steps of:
generating an interrupt acknowledge in response to said interrupt signal, said interrupt acknowledge being generated by said processor;
receiving said interrupt acknowledge in said first I/O bus interface means which serves said first I/O bus to which said first agent is coupled;

determining whether packed data in said first I/O bus interface means has been transferred to said system memory; and generating a retry signal for said processor if packed data in said first I/O bus interface means has not been transferred to said system memory.

10. A method of operating a processor system as claimed in claim 9 wherein said deferring step further comprises the steps of:

monitoring said system bus for a predetermined period of time to determine whether the retry signal is generated; and generating an interrupt vector if the retry signal is not received within said predetermined time period.

11. A method of operating a processor system as claimed in claim 9 wherein said deferring step further comprises the steps of:

removing said processor which generated said interrupt acknowledge from said system bus; and denying access to said system bus by said processor which generated said interrupt acknowledge until packed data in said first I/O bus interface means has been transferred to said system memory.

12. A method of operating a processor system as claimed in claim 11 wherein the step of denying access to said system bus by said processor which generated said interrupt acknowledge until packed data in said first I/O bus interface means has been transferred to said system memory comprises the step of generating an I/O bus busy signal until all packed data in said first I/O bus interface means has been transferred to said system memory.

13. A method of operating a processor system as claimed in claim 12 further comprising the step of locking the first I/O bus after terminating the step of generating an I/O bus busy signal as a result of transferring all packed data from said first I/O bus interface means to said system memory to prevent another agent from gaining control of the first I/O bus until the interrupt acknowledge operations have been completed for the interrupt signal.

14. A method of operating a processor system as claimed in claim 12 wherein the step of generating an I/O bus busy signal until all packed data has been transferred from said first I/O bus interface means to said system memory is performed by said first I/O bus interface means.

15. A method of operating a processor system as claimed in claim 14 wherein said processor includes a cache memory and the step of generating an I/O bus busy signal is continued until all associated coherency operations are completed for the packed data which has been transferred to said system memory.

16. A method of operating a processor system as claimed in claim 14 wherein said first I/O bus interface means issues retry signals to any processor attempting to access said first I/O bus or to do an interrupt acknowledge cycle until said first I/O bus busy signal is no longer being generated.

* * * * *